(12) United States Patent
Mansri (10) Patent No.: US 12,549,090 B2
(45) Date of Patent: Feb. 10, 2026

(54) DIRECT CURRENT DC-DC CONVERTER PIN LIFT DETECTION

(71) Applicant: NXP USA, Inc., Austin, TX (US)

(72) Inventor: Mohammed Mansri, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 368 days.

(21) Appl. No.: 18/122,682

(22) Filed: Mar. 16, 2023

(65) Prior Publication Data

US 2024/0313637 A1    Sep. 19, 2024

(51) Int. Cl.

| H02M 1/32 | (2007.01) |
|---|---|
| G01R 31/70 | (2020.01) |
| H02H 7/12 | (2006.01) |
| H02M 1/08 | (2006.01) |
| H02M 3/155 | (2006.01) |

(52) U.S. Cl.
CPC .............. *H02M 1/32* (2013.01); *G01R 31/70* (2020.01); *H02H 7/1213* (2013.01); *H02M 1/08* (2013.01); *H02M 3/155* (2013.01)

(58) Field of Classification Search
CPC .......... H02M 1/32; H02M 1/08; H02M 3/155; H02H 7/1213; H02H 7/10; H02H 7/1252; H02H 7/127; H02H 7/1255; G01R 31/69; G01R 31/71; G01R 31/70
See application file for complete search history.

(56) References Cited

U.S. PATENT DOCUMENTS

| 8,203,321 | B2 * | 6/2012 | Liang ................. H03K 17/6871 |
| | | | 323/272 |
| 8,237,424 | B2 | 8/2012 | Marty-Blavier et al. |
| 8,237,448 | B2 | 8/2012 | Bertness |
| 8,390,493 | B1 * | 3/2013 | Raghavan ............... H03M 1/00 |
| | | | 341/142 |
| 8,416,546 | B2 | 4/2013 | Arndt et al. |
| 9,641,070 | B2 | 5/2017 | Wibben |
| 10,203,710 | B2 | 2/2019 | Bhattad et al. |
| 10,496,114 | B2 | 12/2019 | Mouret et al. |

(Continued)

FOREIGN PATENT DOCUMENTS

| DE | 102017201210 A1 | 7/2018 |
| JP | 2016181071 A * | 10/2016 |

OTHER PUBLICATIONS

U.S. Appl. No. 19/065,848, filed Feb. 27, 2025; 26 Pages.

*Primary Examiner* — Gary L Laxton
*Assistant Examiner* — Jonathan Walter Soileau (57) ABSTRACT

Embodiments of pin lift detection circuit for a direct current DC-DC converter and DC-DC converters are disclosed. In an embodiment, a pin lift detection circuit for a DC-DC converter includes a current source, a switch connecting the current source to an electrical terminal of the DC-DC converter, a resistive divider connected to the switch and to the electrical terminal of the DC-DC converter, an amplifier connected to the resistive divider, a comparator connected to the amplifier and to the resistive divider, a digital filter connected to the comparator and configured to generate a flag signal in response to a disconnection between the electrical terminal of the DC-DC converter and a load of the DC-DC converter, and a timer circuit configured to generate control signals for the switch, the comparator, and the digital filter.

13 Claims, 6 Drawing Sheets

(56) References Cited

U.S. PATENT DOCUMENTS

| | | |
|---|---|---|
| 11,874,340 B2 | 1/2024 | Mansri et al. |
| 2012/0013367 A1 | 1/2012 | Chen et al. |
| 2015/0362550 A1* | 12/2015 | Wibben ............. G01R 31/2853 |
| | | 324/750.3 |
| 2023/0058315 A1 | 2/2023 | Meng et al. |
| 2024/0283357 A1* | 8/2024 | Corva .................... H02M 3/01 |

* cited by examiner

DIRECT CURRENT DC-DC CONVERTER PIN LIFT DETECTION

BACKGROUND

A direct current DC-DC converter can be used to convert input power with an input DC voltage into an output signal with a desired output DC voltage. A DC-DC converter may be a Buck DC-DC converter in which the input voltage is higher than the output voltage or a Boost DC-DC converter in which the input voltage is higher than the output voltage. When an Integrated Circuit (IC) pin or terminal of a DC-DC converter is lifted or disconnected, a load of the DC-DC converter or the DC-DC converter itself can be damaged. Therefore, there is a need to detect a pin lift condition for a DC-DC regulator without affecting DC-DC regulator efficiency and without an additional pin.

SUMMARY

Embodiments of pin lift detection circuit for a DC-DC converter and DC-DC converters are disclosed. In an embodiment, a pin lift detection circuit for a DC-DC converter includes a current source, a switch connecting the current source to an electrical terminal of the DC-DC converter, a resistive divider connected to the switch and to the electrical terminal of the DC-DC converter, an amplifier connected to the resistive divider, a comparator connected to the amplifier and to the resistive divider, a digital filter connected to the comparator and configured to generate a flag signal in response to a disconnection between the electrical terminal of the DC-DC converter and a load of the DC-DC converter, and a timer circuit configured to generate control signals for the switch, the comparator, and the digital filter. Other embodiments are also described.

In an embodiment, the amplifier includes a first input terminal connected to a reference voltage and a second input terminal configured to receive an output voltage of the resistive divider.

In an embodiment, the pin lift detection circuit further includes a second comparator connected to the amplifier and to a control circuit of the DC-DC converter.

In an embodiment, the amplifier includes an output terminal connected to an input terminal of the second comparator.

In an embodiment, the second comparator is configured to cause the control circuit of the DC-DC converter to disable the DC-DC converter in response to the disconnection between the electrical terminal of the DC-DC converter and the load of the DC-DC converter.

In an embodiment, the second comparator is configured to cause the control circuit of the DC-DC converter to disable a high-side (HS) switch and a low-side (LS) switch of the DC-DC converter in response to the disconnection between the electrical terminal of the DC-DC converter and the load of the DC-DC converter.

In an embodiment, at least one of the HS switch and the LS switch comprises a bipolar junction transistor (BJT) or a metal-oxide-semiconductor field-effect transistor (MOSFET).

In an embodiment, an output inductor and an output capacitor are connected between two electrical terminals of the DC-DC converter.

In an embodiment, the timer circuit is further configured to generate a first control signal to enable or disable the switch and the comparator, and a second control signal to enable or disable the digital filter.

In an embodiment, a rising or falling edge of the second control signal has a delay with respect to a rising or falling edge of the first control signal.

In an embodiment, the pin lift detection circuit further includes a resistor-capacitor (RC) circuit that includes a resistor and a capacitor.

In an embodiment, a DC-DC converter includes a pin lift detection circuit, an HS driver, an HS switch connected to the HS driver, an LS driver, an LS switch connected to the LS driver, and a control circuit connected to the pin lift detection circuit and configured to control the HS driver, the HS switch, the LS driver, and the LS switch. The pin lift detection circuit includes a current source, a switch connecting the current source to an electrical terminal of the DC-DC converter, a resistive divider connected to the switch and to the electrical terminal of the DC-DC converter, an amplifier connected to the resistive divider, a comparator connected to the amplifier and to the resistive divider, a digital filter connected to the comparator and configured to generate a flag signal in response to a disconnection between the electrical terminal of the DC-DC converter and a load of the DC-DC converter, and a timer circuit configured to generate a plurality of control signals for the switch, the comparator, and the digital filter.

In an embodiment, the amplifier includes a first input terminal connected to a reference voltage and a second input terminal configured to receive an output voltage of the resistive divider.

In an embodiment, the pin lift detection circuit further includes a second comparator connected to the amplifier and to the control circuit of the DC-DC converter.

In an embodiment, the second comparator is configured to cause the control circuit of the DC-DC converter to disable the HS switch and the LS switch of the DC-DC converter in response to the disconnection between the electrical terminal of the DC-DC converter and the load of the DC-DC converter.

In an embodiment, an output inductor and an output capacitor are connected between two electrical terminals of the DC-DC converter.

In an embodiment, the timer circuit is further configured to generate a first control signal to enable or disable the switch and the comparator of the pin lift detection circuit, and a second control signal to enable or disable the digital filter.

In an embodiment, a rising or falling edge of the second control signal has a delay with respect to a rising or falling edge of the first control signal.

In an embodiment, the pin lift detection circuit further includes a RC circuit that includes a resistor and a capacitor.

In an embodiment, a pin lift detection circuit for a buck DC-DC converter includes a current source, a switch connecting the current source to an electrical terminal of the buck DC-DC converter, a resistive divider connected to the switch and to the electrical terminal of the buck DC-DC converter, an amplifier connected to the resistive divider, a first comparator connected to the amplifier and to the resistive divider, a digital filter connected to the first comparator and configured to generate a flag signal in response to a disconnection between the electrical terminal of the buck DC-DC converter and a load of the buck DC-DC converter, a timer circuit configured to generate a plurality of control signals for the switch, the first comparator, and the digital filter, and a second comparator connected to the amplifier and to a control circuit of the buck DC-DC converter and configured to cause the control circuit of the buck DC-DC converter to disable the buck DC-DC converter in response to the disconnection between the electrical terminal of the buck DC-DC converter and the load of the buck DC-DC converter.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
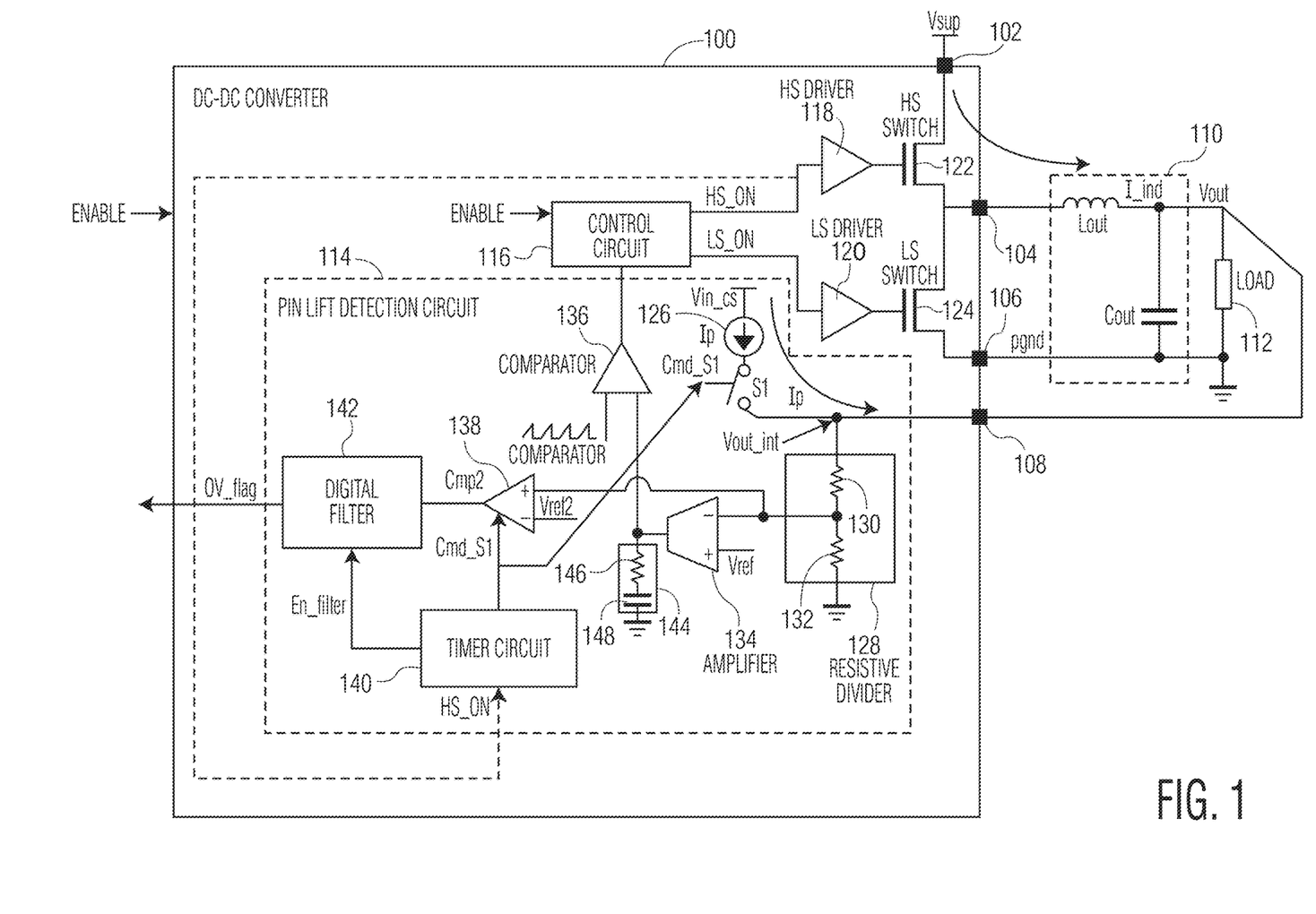
FIG. 1 depicts a DC-DC converter in accordance with an embodiment of the invention.

FIG. 1 is a schematic block diagram of a DC-DC converter 100 in accordance with an embodiment of the invention. The DC-DC converter converts input power with an input or supply DC voltage $V_{SUP}$, which is received from an input or supply electrical terminal or pin 102 into an output signal with a desired output DC voltage $V_{out}$. In the embodiment depicted in FIG. 1, a load 112 is connectable to the DC-DC converter through an inductor-capacitor (LC) network 110, which includes an external inductor Lout and an external capacitor Cout, through electrical terminals or pins 104, 106, 108. The DC-DC converter can be used in various applications, such as automotive applications, communications applications, industrial applications, medical applications, computer applications, and/or consumer or appliance applications. In some embodiments, the DC-DC converter is included in a computing device, such as a smartphone, a tablet computer, a laptop, etc. In some embodiments, the DC-DC converter is implemented in a substrate, such as a semiconductor wafer. In an embodiment, the DC-DC converter is constructed as a stand-alone semiconductor IC chip. In the embodiment depicted in FIG. 1, the DC-DC converter is a Buck DC-DC converter in which the input voltage, $V_{IN}$, is higher than the output voltage, $V_{OUT}$. However, in some embodiments, the DC-DC converter is a Boost DC-DC converter in which the input voltage, $V_{IN}$, is lower than the output voltage, $V_{OUT}$.

In the embodiment depicted in FIG. 1, the DC-DC converter 100 includes the input or supply electrical terminal or pin 102, the electrical terminals or pins 104, 106, 108, a control circuit 116, a high-side (HS) driver 118, a low-side (LS) driver 120, an HS switch 122, an LS switch 124, and a pin lift detection circuit 114 configured to detect a pin lift or disconnection in the DC-DC converter 100. In the embodiment depicted in FIG. 1, the pin lift detection circuit 114 includes a current source 126, a switch S1, a resistive divider 128 that includes two resistors 130, 132, an amplifier 134, a first comparator 136, a second comparator 138, a timer circuit 140, a digital filter 142, and a resistor-capacitor (RC) compensation circuit 144 that includes a resistor 146 and a capacitor 148. In some embodiments, the DC-DC converter 100 (e.g., the control circuit 116, the HS driver 118, the LS driver 120, the HS switch 122, the LS switch 124, and the pin lift detection circuit 114) are included in an Integrated Circuit (IC) chip (e.g., a system-on-chip (SoC)) while the LC network 110 and the load 112 are included in a printed circuit board (PCB). For example, the DC-DC converter 100 and the LC network 110 is included in a DC-DC converter system. An enable signal can be switched to "0" to turn off the DC-DC converter 100 or switched to "1" to turn on the DC-DC converter 100. Although the DC-DC converter 100 is shown in FIG. 1 as including certain circuit elements, in other embodiments, the DC-DC converter may include one or more additional circuit elements.

In the embodiment depicted in FIG. 1, the HS switch 122 is connected to the input or supply electrical terminal or pin 102 from which the input or supply DC voltage, $V_{SUP}$, is received. The HS switch 122 may be implemented as a transistor, for example, a Bipolar Junction Transistor (BJT) or a Metal oxide semiconductor field effect transistor (MOSFET). In the embodiment depicted in FIG. 1, the LS switch 124 is connected to the electrical terminal or pin 106, which is connected to the ground (zero volt). The LS switch 124 may be implemented as a transistor, for example, a BJT or a MOSFET.

In the embodiment depicted in FIG. 1, the current source 126 is a circuit that is connected to a voltage terminal or rail having a voltage $V_{in\_cs}$ and to the switch S1 connecting the current source 126 to the electrical terminal or pin 108 of the DC-DC converter. In some embodiments, the voltage $V_{in\_cs}$ is higher than the regulated output voltage $V_{out}$ of the DC-DC converter 100. The current source 126 provides a current Ip to the switch S1, which is controlled by a signal Cmd_S1 that is generated by the timer circuit 140, and is connected to the electrical terminal or pin 108. When the switch S1 is enabled (i.e., being conductive), a current Ip flows to the electrical terminal or pin 108 from the switch S1.

In the embodiment depicted in FIG. 1, the resistive divider 128 is connected to the switch S1, to the electrical terminal or pin 108, to the amplifier 134, and to the comparator 138. The resistive divider 128 operates as a feedback resistor bridge. In some embodiments, there is no feedback bridge (i.e., the resistive divider 128) and the output voltage Vout can be applied to the amplifier 134 and the comparator 138.

In the embodiment depicted in FIG. 1, the amplifier 134 is connected to the resistive divider 128. The amplifier 134 may be a transconductance (Gm) amplifier. Specifically, a reference voltage Vref is applied to a positive terminal of the amplifier 134 and a feedback signal from the resistive divider 128 is applied to a negative terminal of the amplifier 134. The comparator 136 is connected to the amplifier 134 and to the control circuit 116 of the DC-DC converter 100. An output terminal of the amplifier 134 is connected to an input terminal of the comparator 136. The output of the amplifier 134 and a pulse signal are applied to the comparator 136, which may be, for example, a pulse-width modulation (PWM) comparator. The output of the amplifier 134 is also applied to the RC compensation circuit 144. In the embodiment depicted in FIG. 1, the comparator 136 is configured to cause the control circuit 116 of the DC-DC converter to control the HS switch 122 and the LS switch 124 of the DC-DC converter to regulate the output voltage Vout. In case of no pin lift, the current source 126 does not impact the behavior of the DC-DC converter because the current Ip from the current source 126 is absorbed by the capacitor Cout. In case a disconnection between the electrical terminal 108 of the DC-DC converter and the load 112 of the DC-DC converter, the comparator 136 causes the control circuit 116 to turn on the HS switch 122 and the switch S1. Because the electrical terminal 108 is disconnected from the load 112, the current Ip from the current source 126 increases the input voltage Vout_int of amplifier 134 and the comparator 138, which causes the comparators 138 and 136 to trigger (e.g., their outputs changing from 0 to 1) and the flag signal Ov_flag to trigger also (e.g., changing from 0 to 1). The flag signal OV_flag is latched, which indicates that there is a pin disconnect. In this case, an enable signal can be switched to "0" and the control circuit 116 can turn off the DC-DC converter by keeping the HS switch 122 and the LS switch 124 in the off state. For example, the enable signal can cause the control circuit 116 to disable the HS switch 122 and the LS switch 124 of the DC-DC converter in response to a disconnection between the electrical terminal 108 of the DC-DC converter and the load 112 of the DC-DC converter. The enable signal can be switched to "0" to turn off the control circuit 116 or switched to "1" to turn on the control circuit 116.

In the embodiment depicted in FIG. 1, the control circuit 116 is a main loop controller that is configured to generate or to set control signals for the HS driver 118, the LS driver 120, the HS switch 122, and the LS switch 124 based on the output of the comparator 136. The control circuit 116, the HS driver 118, the LS driver 120, the HS switch 122, the LS switch 124, the LC network 110, the load 112 can form a main control loop. For example, the control circuit 116 is configured to generate or to set an enablement or disablement signal HS_ON for the HS driver 118 and the HS switch 122, and to generate or to set an enablement or disablement signal LS_ON for the LS driver 120 and the LS switch 124. In some embodiments, the enablement or disablement signal HS_ON is also applied to the timer circuit 140 to control the timer circuit 140 (e.g., a rising edge of the enablement or disablement signal HS_ON starts the timer 140) to bias the comparator 138. The control circuit 116 may be implemented by at least one processor (e.g., a microcontroller, a digital signal processor (DSP), a central processing unit (CPU), or an embedded processor). The DC-DC converter 100 depicted in FIG. 1 can operate under a low-power mode and under a high-power mode. Under the low-power mode, the quiescent current is kept as low as possible. Under the low-power mode and under the high-power mode, the injected current Ip is absorbed by the load 112. For high load or light load conditions, there is no additional output ripple on the output voltage Vout of the external capacitor Cout.

In the embodiment depicted in FIG. 1, the comparator 138 is an over-voltage comparator that is connected to the negative input terminal of the amplifier 134 and to an output of the resistive divider 128. In some embodiments, there is no feedback bridge (i.e., the resistive divider 128) and the comparator 138 is connected to the pin 108. Specifically, a reference voltage Vref2 is applied to a negative terminal of the comparator 138 and a feedback signal from the resistive divider 128 or the pin 108 is applied to a positive terminal of the comparator 138. In the embodiment depicted in FIG. 1, the comparator 138 does not require a dedicated feedback bridge and does not need to use a different bandgap circuit than the bandgap circuit used by the DC-DC converter 100. The output of the comparator 138 is applied to the digital filter 142.

In the embodiment depicted in FIG. 1, the timer circuit 140 is configured to generate or to set control signals for the switch S1, the comparator 138, and the digital filter 142. For example, the timer circuit 140 is configured to configured to generate or to set a signal Cmd_S1 to enable or disable the comparator 138 and the switch S1 and to generate or to set a signal En_filter to enable or disable the digital filter 142. In some embodiments, a rising or falling edge of the signal En_filter has a delay with respect to a corresponding rising or falling edge of the signal Cmd_S1 to avoid potential glitch. The timer circuit 140 may be controlled (e.g., enabled or disabled or set to a specific value) by the control signal HS_ON that is generated by the control circuit 116 (e.g., a rising edge of the enablement or disablement signal HS ON starts the timer circuit 140).

In the embodiment depicted in FIG. 1, the digital filter 142 is connected to the comparator 138 and is configured to generate or to set an over-voltage (OV) flag signal OV_flag in response to a disconnection between the electrical terminal 108 of the DC-DC converter and the load 112 of the DC-DC converter. Specifically, the digital filter 142 is configured to generate or to set the OV flag signal OV_flag based on the output Cmp2 of the comparator 138. In some embodiments, the digital filter 142 is a digital de-glitcher that removes digital glitch from the output Cmp2 of the comparator 138, and the flag signal OV_flag can be latched.

Figure 2:
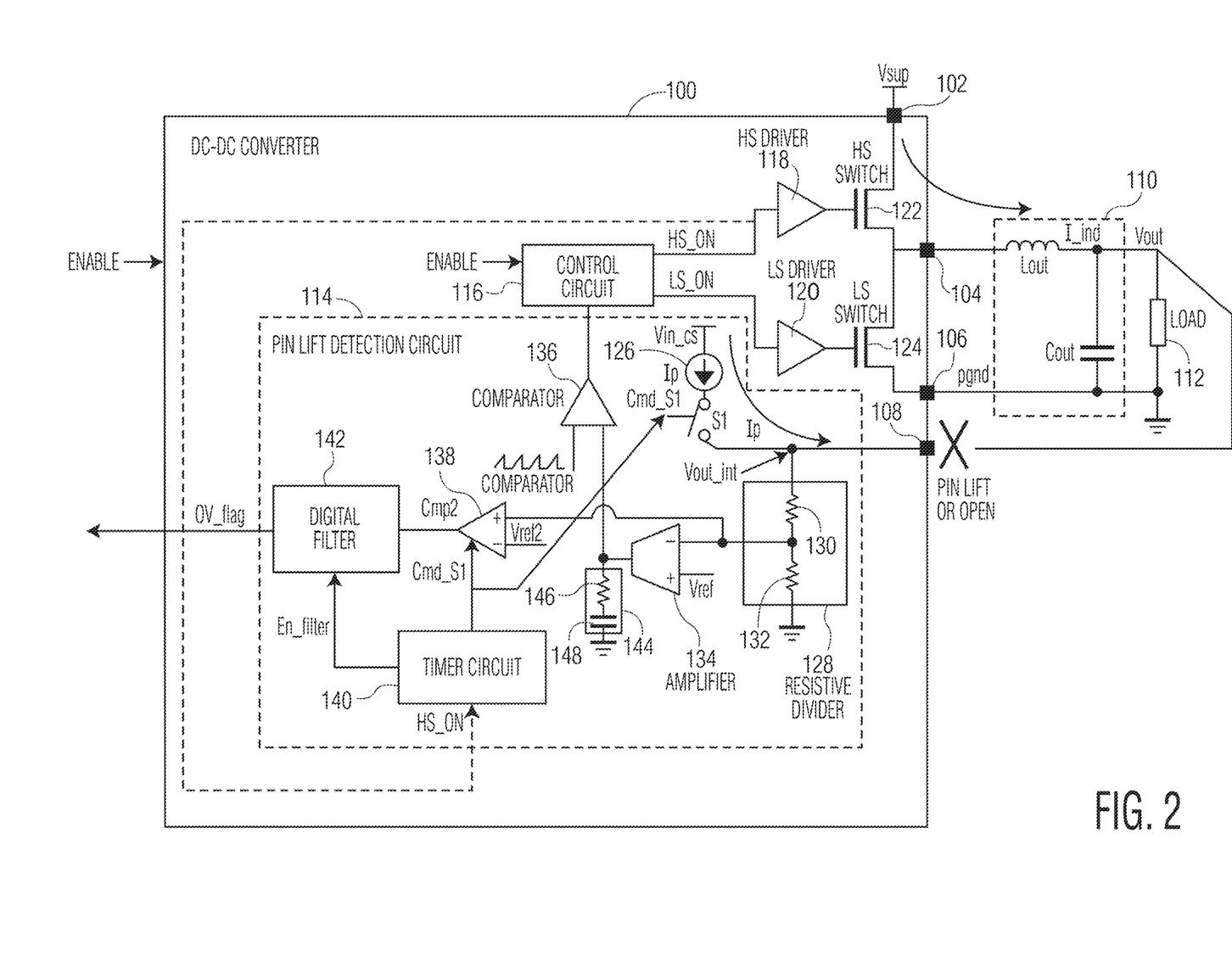
FIG. 2 depicts the DC-DC converter depicted in FIG. 1 when an electrical terminal or pin of the DC-DC converter is lifted or disconnected.

In the DC-DC converter 100 depicted in FIG. 1, when an IC pin or terminal is lifted or disconnected from the load 112, the load 112 of the DC-DC converter 100 or the DC-DC converter itself can be damaged, for example, because of over-voltage condition caused by the pin lift condition. FIG. 2 depicts the DC-DC converter 100 depicted in FIG. 1 when the electrical terminal or pin 108 is lifted or disconnected. During the pin lift condition in FIG. 2, the external LC network 110 and the load 112 are disconnected from the electrical terminal or pin 108. Consequently, the feedback signal from the load 112 is pulled down to the ground. The control circuit 116 turns on the HS driver 118 and the HS switch 122, and the current source 126 injects a current Ip to the feedback electrical terminal or pin 108. In some embodiments, the current Ip is higher than the quiescent current of the feedback bridge in normal mode when there is no pin lift condition. The voltage at the feedback electrical terminal or pin 108 is pulled up to a voltage level that is higher than a target level at which the comparator 138 that monitor the feedback electrical terminal or pin 108 triggers. Subsequently, the control circuit 116 turns off the HS driver 118 and the HS switch 122. The periodically injected current Ip pulls up the output of the DC-DC converter 100, and the over-voltage is detected by the comparator 138 and the digital filter 142 to produce an OV flag signal OV_flag to notify, for example, a state machine that a fault has occurred. For example, in a typical DC-DC converter, a main control loop can keep a high-side of the DC-DC converter on under a pin lift condition and the output voltage of the DC-DC converter can reach the input voltage level of the DC-DC converter, which can damage a corresponding load and the DC-DC converter itself. In general, an additional pin, a feedback bridge, and an overvoltage comparator that is biased continuously can be used to detect an over voltage and the pin lift. However, this configuration can increase the quiescent current in a low power mode and does not protect the load because the over voltage comparator required a de-glitcher, in general the de-glitcher is too high to limit the over voltage seen by the load.

In the DC-DC converter 100, the Cmd_S1 signal can control the switch S1 to avoid keeping the HS switch 122 on in case of a pin lift condition, and protect the load 112 against over voltage at Vout. high inductor current under a pin lift condition is avoided. For example, in the DC-DC converter 100, the timer circuit 140 can be configured to turn off the switch S1 and the comparator 138 and reduce the quiescent current when the HS switch 122 is turned off. When the HS switch 122 is turned on, the current Ip and the quiescent current of the over voltage comparator 138 are too low, compared to the current provided by the HS switch 122. Consequently, the load is protected and there is almost no additional quiescent current.

Figure 3:
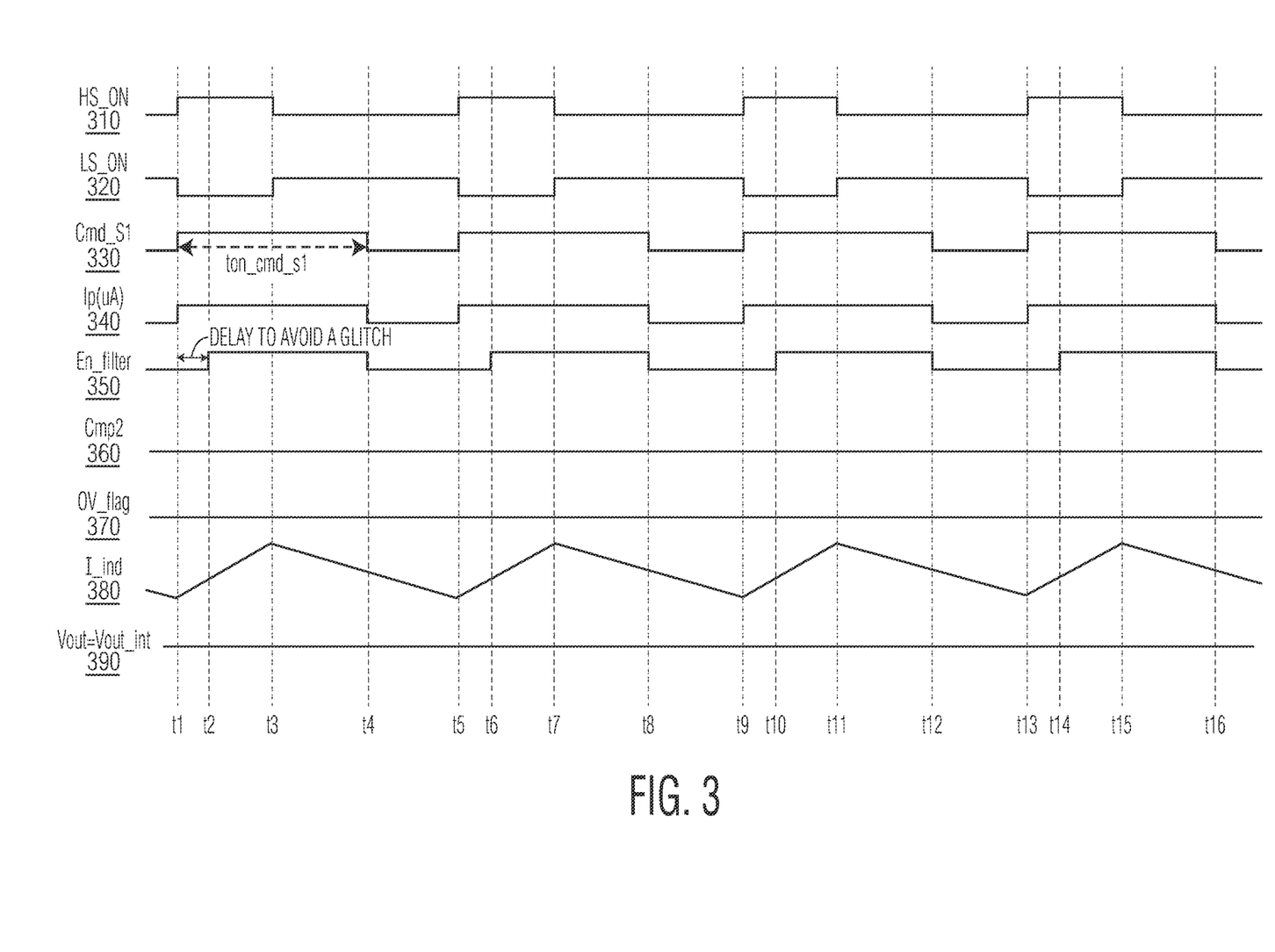
FIG. 3 depicts a signal timing diagram that corresponds to the DC-DC converter depicted in FIG. 1 when there is no pin lift condition.

FIG. 3 depicts a signal timing diagram that corresponds to the DC-DC converter 100 depicted in FIG. 1 when there is no pin lift condition. In the signal timing diagram illustrated in FIG. 3, the high-side (HS) control signal HS_ON has a waveform 310, the low-side (LS) control signal LS_ON has a waveform 320, the control signal Cmd_S1 that is generated by the timer circuit 140 has a waveform 330, the current Ip that flows to the electrical terminal or pin 108 from the switch S1 has a waveform 340, the enablement signal En_filter that is generated by the timer circuit 140 has a waveform 350, the output signal Cmp2 that is generated by the comparator 138 has a waveform 360, the flag signal OV_flag that is generated by the digital filter 142 has a waveform 370, the inductor current I_ind that flows through the inductor Lout has a waveform 380, and the output voltage Vout and the voltage Vout_int of the DC-DC converter 100 have a waveform 390.

At time point t1, the HS control signal HS_ON 310 changes from 0 to 1, and the LS control signal LS_ON 320 changes from 1 to 0. The current Ip 340 is injected by the current source 126 when the controller circuit 116 turn on the high-side (i.e., the HS control signal HS_ON 310 is 1). Specifically, the timer circuit 140 generates or sets the control signal Cmd_S1 330, which changes from 0 to 1 with the rising edge of the HS control signal HS_ON at time point t1. The timer circuit 140 keeps the control signal Cmd_S1 on for a time duration ton_Cmd_S. Consequently, the current Ip is applied by the current source 126, and the inductor current I_ ind 380 starts to increase. The control signal Cmd_S1 turn on the switch S1, biases the comparator 138 and enables the digital filter 142. When the switch S1 is turned on (i.e., being conductive), the current Ip flows to the electrical terminal or pin 108 from the switch S1. At time point t2, the enablement signal En_filter 350 that is generated by the timer circuit 140 changes from 0 to 1, which is delayed compared to the control signal Cmd_S1 330 to avoid potential glitch. When the switch S1 is turned on (i.e., being conductive), the current Ip applied by the current source 126 is absorbed by the load 112.

At time point t3, the HS control signal HS_ON 310 changes from 1 to 0, the LS control signal LS_ON 320 changes from 0 to 1, and the inductor current I_ind 380 starts to decrease. At time point t4, the control signal Cmd_S1 330 changes from 1 to 0, the switch S1 is turned off (i.e., being non-conductive), the current Ip is no longer applied to the electrical terminal or pin 108, and the enablement signal En filter 350 changes from 1 to 0. There is no additional ripple on the output voltage Vout 390 of the DC-DC converter 100 because the current Ip injected by the current source 126 is much lower than the inductor current I_ind 380. For example, when the inductor current I_ind 380 is 300 mA, the quiescent current on the feedback bridge is 3 uA. By sizing the current Ip to be equal to 6 uA, the additional current to the load 112 coming from the current source 126 is 0.1%. Consequently, the output signal Cmp2 360 and the flag signal OV_flag 370 stays at zero and the output voltage Vout and the voltage Vout_int stay at or around the same voltage level from time point t1 to time point t4.

From time point t5 to time point t8, from time point t9 to time point t12, from time point t13 to time point t116, the high-side (HS) control signal HS_ON 310, the low-side (LS) control signal LS_ON 320, the control signal Cmd_S1 330, the current Ip, the enablement signal En_filter 350, the output signal Cmp2 360, the flag signal OV_flag 370, the inductor current I_ind 380, and the output voltage Vout and the voltage Vout_int 390 perform identically as from time point t1 to time point t4.

Figure 4:
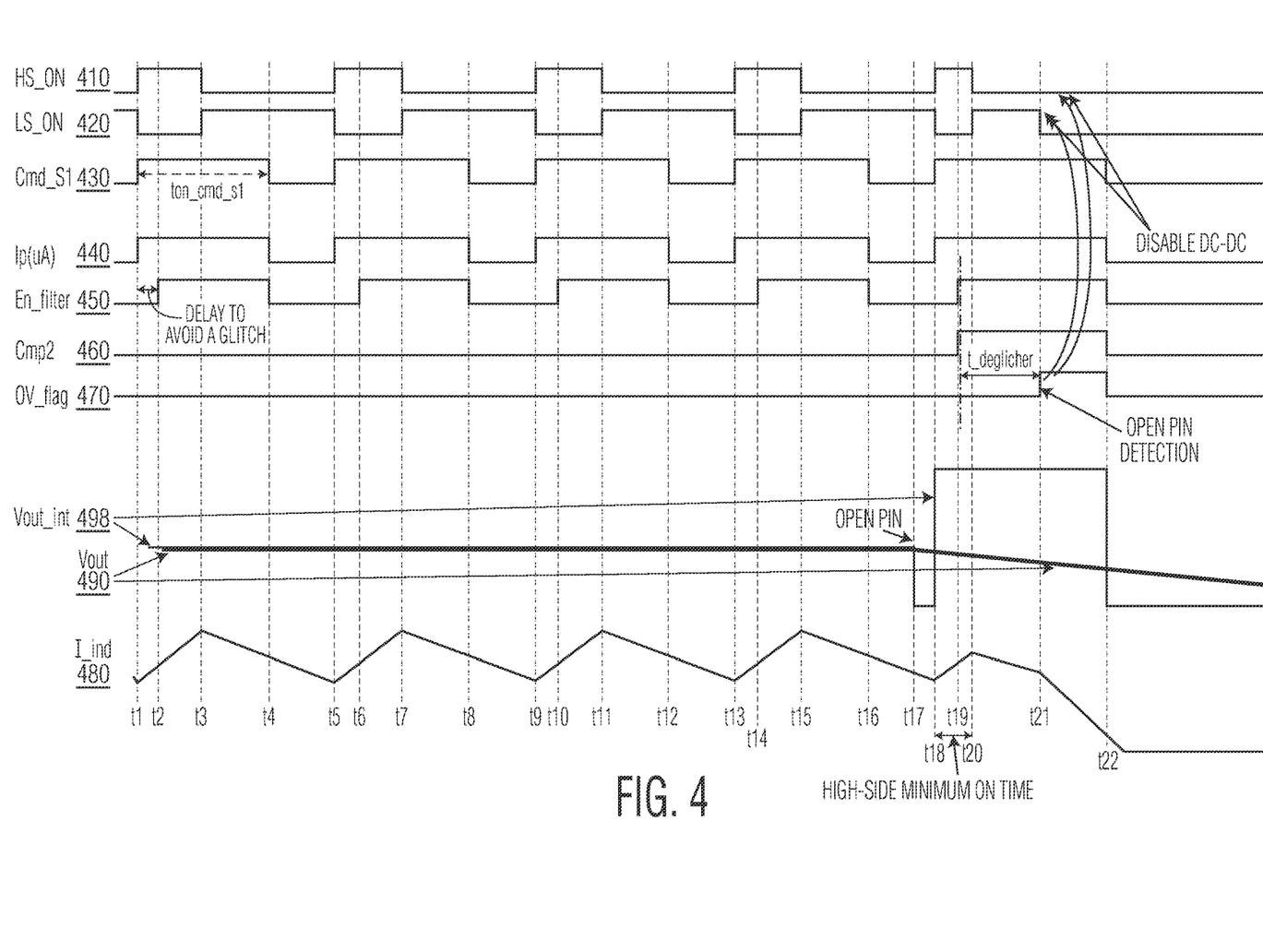
FIG. 4 depicts a signal timing diagram that corresponds to the DC-DC converter depicted in FIG. 1 when there is a pin lift condition.

FIG. 4 depicts a signal timing diagram that corresponds to the DC-DC converter 100 depicted in FIG. 1 when there is a pin lift condition. In the signal timing diagram illustrated in FIG. 4, the HS control signal HS_ON has a waveform 410, the LS control signal LS_ON has a waveform 420, the control signal Cmd_S1 that is generated by the timer circuit 140 has a waveform 430, the current Ip that flows to the electrical terminal or pin 108 from the switch S1 has a waveform 440, the enablement signal En_filter that is generated by the timer circuit 140 has a waveform 450, the output signal Cmp2 that is generated by the comparator 138 has a waveform 460, the flag signal OV_flag that is generated by the digital filter 142 has a waveform 470, the inductor current I_ind that flows through the inductor Lout has a waveform 480, the output voltage Vout of the DC-DC converter 100 has a waveform 490, the voltage Vout_int has a waveform 498. The waveform 410 of the HS control signal HS_ON, the waveform 420 of the LS control signal LS_ON, the waveform 430 of the control signal Cmd_S1, the waveform 440 of the current Ip, the waveform 450 of the enablement signal En_filter, the waveform 460 of the output signal Cmp2 that is generated by the comparator 138, the waveform 470 of the flag signal OV_flag that is generated by the digital filter 142, the waveform 480 of the inductor current I ind that flows through the inductor Lout, and the waveform 490 of the output voltage Vout of the DC-DC converter 100 depicted in FIG. 4 are similar to the waveform 310 of the HS control signal HS_ON, the waveform 320 of the LS control signal LS_ON, the waveform 330 of the control signal Cmd_S1, the waveform 340 of the current Ip, the waveform 350 of the enablement signal En_filter, the waveform 360 of the output signal Cmp2 that is generated by the comparator 138, the waveform 370 of the flag signal OV_flag that is generated by the digital filter 142, the waveform 380 of the inductor current I_ind that flows through the inductor Lout, and the waveform 390 of the output voltage Vout of the DC-DC converter 100 depicted in FIG. 3, between time point t1 and time point t16, respectively.

The pin lift condition starts from time point t17. At time point t17, the electrical terminal/pin 108 is disconnected from the load 112 and the output voltage Vout of the DC-DC converter 100 and the voltage Vout_int decrease. At time point t18, the HS control signal HS_ON 410 changes from 0 to 1, and the LS control signal LS_ON 420 changes from 1 to 0, and the voltage Vout_int increases. The current Ip is injected by the current source 126 when the controller circuit 116 turn on the high-side (i.e., the HS control signal HS_ON 410 is 1). Specifically, the timer circuit 140 generates or sets the control signal Cmd_S1 430, which changes from 0 to 1 with the rising edge of the HS control signal HS_ON. The timer circuit 140 keeps the control signal Cmd_SI on for a predefined time duration. The control signal Cmd_S1 turn on the switch S1, biases the comparator 138 and enables the digital filter 142. Consequently, the current Ip flowing to the electrical terminal or pin 108 from the switch S1 flows through the resistive divider 128 (in case no feedback bridge, the current can pull up the voltage vout_int) because the electrical terminal/pin 108 is disconnected from the load 112. The amplifier 134 amplifies the output voltage of the resistive divider 128 and the output signal Cmp2 of the comparator 138 changes from 0 to 1 at time point t19. At time point t19, the enablement signal En_filter 450, which is delayed compared to the control signal Cmd_S1 430 to avoid potential glitch, also changes from 0 to 1. The digital filter 142 is enabled at time point t19, and the output signal Cmp2 of the comparator 138 changes from 0 to 1 at time point t19.

The amplifier 134 amplifies the output voltage of the resistive divider 128 and the comparator 136 generates or sets a control signal for the control circuit 116, which sets the HS control signal HS_ON 410 from 1 to 0, disabling the HS driver 118 and the HS switch 122, and the LS control signal LS_ON 420 from 0 to 1, enabling the LS driver 120 and the LS switch 124 at time point t20. Time duration between time point t18 and time point t20 may be the minimum time the HS switch 122 is turned on. Subsequently, at time point t21, the digital filter 142 sets the flag signal OV_flag from 0 to 1, which can disable the DC-DC converter 100. For example, at time point t21, the control circuit 116 sets the LS control signal LS_ON 420 from 1 to 0 and disables the LS driver 120 and the LS switch 124. Subsequently, the timer circuit 140 is disabled and the control signal Cmd_S1 changes from 1 to 0 at time point t22, which disables the switch S1 (i.e., being not conductive) and the comparator 138 and the current Ip is no longer applied to the electrical terminal/pin 108 and the resistive divider 128, and the voltage Vout_int decreases. In addition, the enablement signal En_filter changes from 1 to 0 and the digital filter 142 is disabled. Consequently, the flag signal OV_flag and the output signal Cmp2 of the comparator 138 changes from 1 to 0. Because the load 112 is connected to the output voltage Vout, which does not have a surge similar to the voltage Vout_int during a pin lift condition, the load 112 is not damaged by over-voltage.

Figure 5:
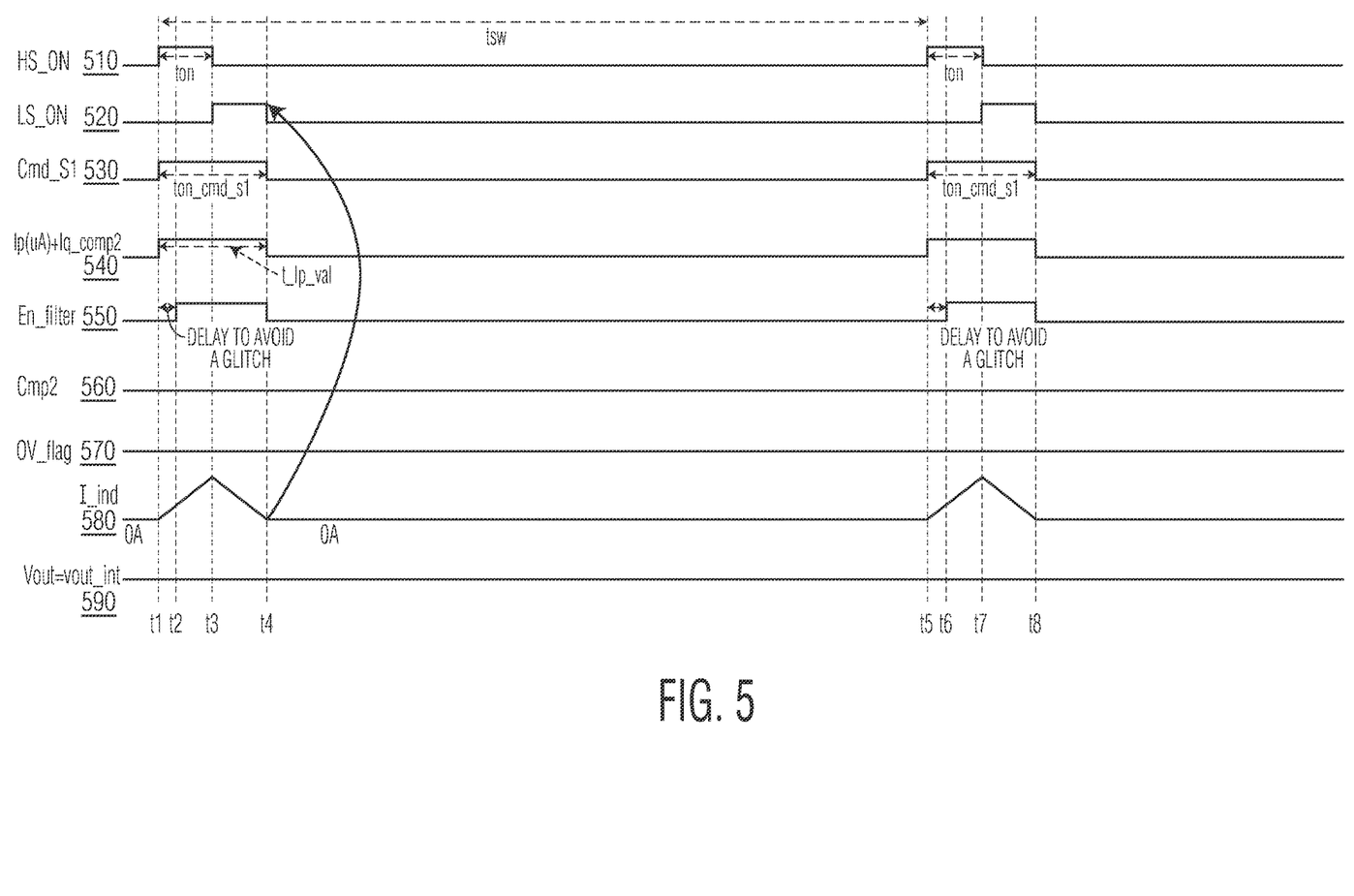
FIG. 5 depicts a signal timing diagram that corresponds to the DC-DC converter depicted in FIG. 1 operating under a low-power mode when there is no pin lift condition.

FIG. 5 depicts a signal timing diagram that corresponds to the DC-DC converter 100 depicted in FIG. 1 operating under a low-power mode when there is no pin lift condition. In the signal timing diagram illustrated in FIG. 5, the HS control signal HS_ON has a waveform 510, the LS control signal LS_ON has a waveform 520, the control signal Cmd_S1 that is generated by the timer circuit 140 has a waveform 530, the sum of the current Ip that flows to the electrical terminal or pin 108 from the switch S1 and the quiescent current Iq_comp2 of the comparator 138 has a waveform 540 (the signal Cmd_S1 enables the comparator 138, in case Cmd_S1=0 the comparator 138 is disabled and the quiescent current Iq_comp2 is equal to zero, in case Cmd_S1=1, the quiescent current Iq_comp2 is larger than zero), the enablement signal En_filter that is generated by the timer circuit 140 has a waveform 550, the output signal Cmp2 that is generated by the comparator 138 has a waveform 560, the flag signal OV_flag that is generated by the digital filter 142 has a waveform 570, the inductor current I_ind that flows through the inductor Lout has a waveform 580, and the output voltage Vout and the voltage Vout_int of the DC-DC converter 100 have a waveform 590.

At time point t1, the HS control signal HS_ON 510 changes from 0 to 1. The current Ip is injected by the current source 126 when the controller circuit 116 turn on the high-side (i.e., the HS control signal HS_ON 310 is 1). Specifically, the timer circuit 140 generates or sets the control signal Cmd_S1 530, which changes from 0 to 1 with the rising edge of the HS control signal HS_ON at time point t1. The timer circuit 140 keeps the control signal Cmd_SI on for a time duration ton_Cmd_S, which is set to be t_ip_val that is shorter than the ON time duration under normal operational mode. Consequently, the current Ip is applied by the current source 126, and the inductor current I_ind 580 starts to increase. The control signal Cmd_S1 turn on the switch S1, biases the comparator 138 and enables the digital filter 142. When the switch S1 is turned on (i.e., being conductive), the current Ip flows to the electrical terminal or pin 108 from the switch S1. At time point t2, the enablement signal En_filter 550 that is generated by the timer circuit 140 changes from 0 to 1, which is delayed compared to the control signal Cmd_S1 530 to avoid potential glitch. When the switch S1 is turned on (i.e., being conductive), the current Ip applied by the current source 126 is absorbed by the load 112. At time point t3, the HS control signal HS_ON 510 changes from 1 to 0, the LS control signal LS_ON 520 changes from 0 to 1, and the inductor current I_ind 580 starts to decrease. At time point t4, the control signal Cmd_S1 530 changes from 1 to 0, the switch S1 is turned off (i.e., being non-conductive), the current Ip is no longer applied to the electrical terminal or pin 108, and the enablement signal En_filter 550 changes from 1 to 0. There is no additional ripple on the output voltage Vout 390 of the DC-DC converter 100 because the current Ip injected by the current source 126 is much lower than the inductor current I_ind 580. From time point t5 to time point t8, the high-side (HS) control signal HS_ON 510, the low-side (LS) control signal LS_ON 520, the control signal Cmd_S1 530, the current Ip 540, the enablement signal En_filter 550, the output signal Cmp2 560, the flag signal OV_flag 570, the inductor current I_ind 580, and the output voltage Vout and the output voltage Vout and the voltage Vout_int 590 perform identically as from time point t1 to time point t4. Under the low-power mode, the time tsw between positive edge of the control signal HS_ON 510 can be much longer than the positive period t_ip_val of the control signal Cmd_S1. For example, the time tsw between consecutive positive edges of the control signal HS ON 510 can be 3 milliseconds (ms) while the positive period t_ip_val of the control signal Cmd_S1 can be 2 microseconds (µs), the additional quiescent current is 2 u/3 ms*(Ip+Iq_cmp2)=0.06%*(Ip+Iq_cmp2).

Figure 6:
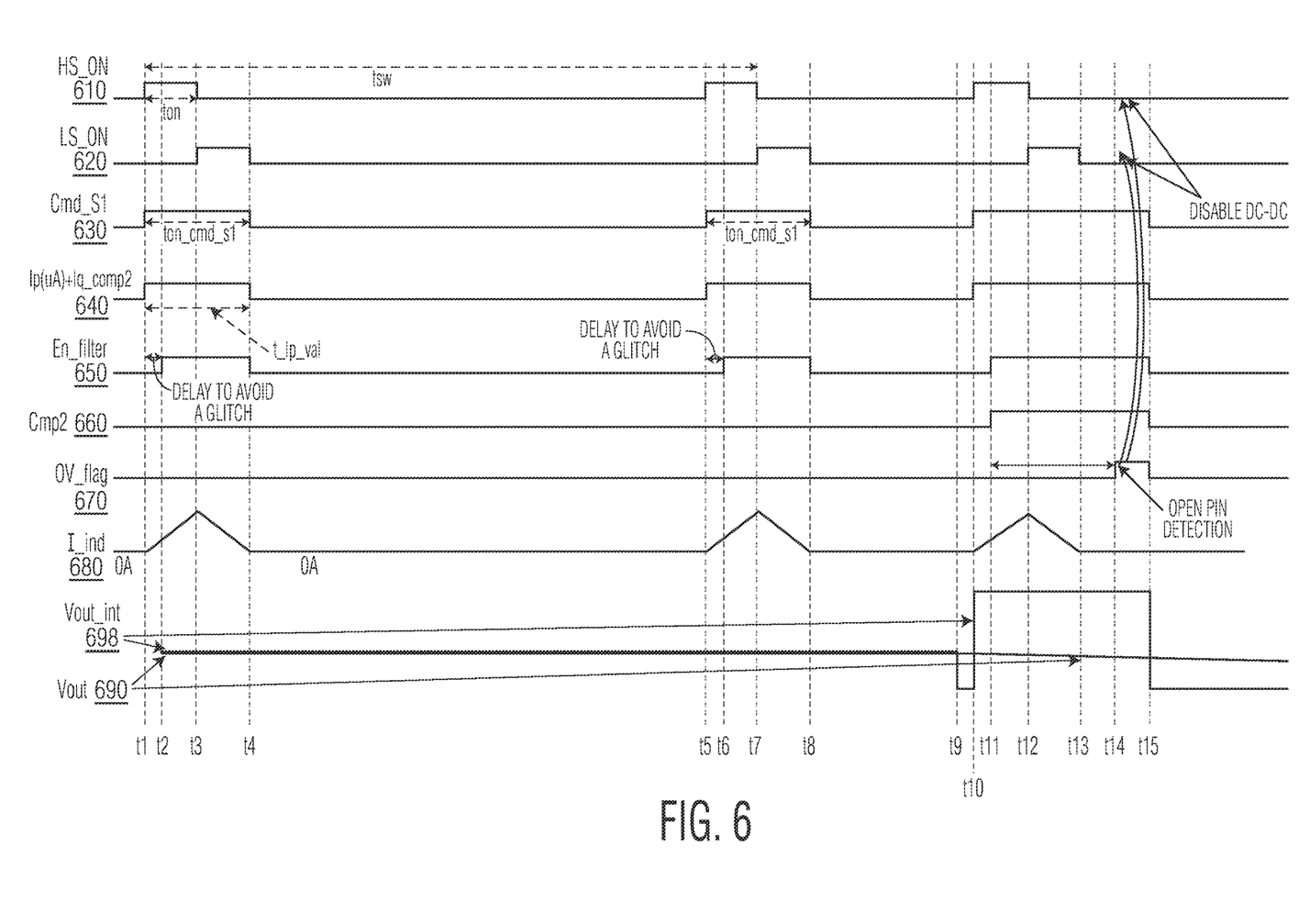
FIG. 6 depicts a signal timing diagram that corresponds to the DC-DC converter depicted in FIG. 1 operating under a low-power mode when there is a pin lift condition.

FIG. 6 depicts a signal timing diagram that corresponds to the DC-DC converter 100 depicted in FIG. 1 operating under a low-power mode when there is a pin lift condition. In the signal timing diagram illustrated in FIG. 6, the HS control signal HS_ON has a waveform 610, the LS control signal LS_ON has a waveform 620, the control signal Cmd_S1 that is generated by the timer circuit 140 has a waveform 630, the sum of the current Ip that flows to the electrical terminal or pin 108 from the switch S1 and the quiescent current Iq_comp2 of the comparator 138 has a waveform 640 (the signal Cmd_S1 enables the comparator 138, in case Cmd_S1=0 the comparator 138 is disabled and the quiescent current Iq_comp2 is equal to zero, in case Cmd_S1=1, the quiescent current lq_comp2 is larger than zero), the enablement signal En_filter that is generated by the timer circuit 140 has a waveform 650, the output signal Cmp2 that is generated by the comparator 138 has a waveform 660, the flag signal OV_flag that is generated by the digital filter 142 has a waveform 670, the inductor current I_ind that flows through the inductor Lout has a waveform 5680, the output voltage Vout of the DC-DC converter 100 have a waveform 690, and the voltage Vout_int of the DC-DC converter 100 have a waveform 698. The waveform 610 of the HS control signal HS_ON, the waveform 620 of the LS control signal LS_ON, the waveform 630 of the control signal Cmd_S1, the waveform 640 of the current Ip, the waveform 650 of the enablement signal En_filter, the waveform 660 of the output signal Cmp2 that is generated by the comparator 138, the waveform 670 of the flag signal OV_flag that is generated by the digital filter 142, the waveform 680 of the inductor current I_ind that flows through the inductor Lout, and the waveform 690 of the output voltage Vout of the DC-DC converter 100 depicted in FIG. 6 are similar to the waveform 510 of the HS control signal HS_ON, the waveform 520 of the LS control signal LS_ON, the waveform 530 of the control signal Cmd_S1, the waveform 540 of the current Ip, the waveform 550 of the enablement signal En_filter, the waveform 560 of the output signal Cmp2 that is generated by the comparator 138, the waveform 570 of the flag signal OV_flag that is generated by the digital filter 142, the waveform 580 of the inductor current I_ind that flows through the inductor Lout, and the waveform 590 of the output voltage Vout of the DC-DC converter 100 depicted in FIG. 3, between time point t1 and time point t8, respectively.

The pin lift condition starts from time point t9. At time point t9, the electrical terminal/pin 108 is disconnected from the load 112 and the output voltage Vout of the DC-DC converter 100 and the voltage Vout_int decrease. At time point t10, the HS control signal HS_ON 610 changes from 0 to 1, and the voltage Vout_int increases. The current Ip is injected by the current source 126 when the controller circuit 116 turn on the high-side (i.e., the HS control signal HS_ON 610 is 1). Specifically, the timer circuit 140 generates or sets the control signal Cmd_S1 630, which changes from 0 to 1 with the rising edge of the HS control signal HS_ON. The timer circuit 140 keeps the control signal Cmd_S1 on for a predefined time duration. The control signal Cmd_S1 turn on the switch S1, biases the comparator 138 and enables the digital filter 142. Consequently, the current Ip flowing to the electrical terminal or pin 108 from the switch S1 flows through the resistive divider 128 (in case no feedback bridge, the current can pull up the voltage vout_int) because the electrical terminal/pin 108 is disconnected from the load 112. The amplifier 134 amplifies the output voltage of the resistive divider 128 and the output signal Cmp2 of the comparator 138 changes from 0 to 1 at time point t11. At time point t11, the enablement signal En_filter 650, which is delayed compared to the control signal Cmd_S1 630 to avoid potential glitch, also changes from 0 to 1. The digital filter 142 is enabled at time point t11, and the output signal Cmp2 of the comparator 138 changes from 0 to 1 at time point t11. The amplifier 134 amplifies the output voltage of the resistive divider 128 and the comparator 136 generates or sets a control signal for the control circuit 116, which sets the HS control signal HS_ON 610 from 1 to 0, disabling the HS driver 118 and the HS switch 122, and the LS control signal LS_ON 620 from 0 to 1, enabling the LS driver 120 and the LS switch 124 at time point t12. Subsequently, at time point t13, the control circuit 116 sets the LS control signal LS_ON 620 from 1 to 0 and disables the LS driver 120 and the LS switch 124, which can disable the DC-DC converter 100. Next, the digital filter 142 sets the flag signal OV_flag from 0 to 1 and the pin lift condition is detected at time point t14. Subsequently, the timer circuit 140 is disabled and the control signal Cmd_S1 changes from 1 to 0 at time point t15, which disables the switch S1 (i.e., being not conductive) and the comparator 138 and the current Ip is no longer applied to the electrical terminal/pin 108 and the resistive divider 128, and the voltage Vout_int decreases. In addition, the enablement signal En_filter changes from 1 to 0 and the digital filter 142 is disabled. Consequently, the flag signal OV_flag and the output signal Cmp2 of the comparator 138 changes from 1 to 0.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, electrically erasable programmable read-only memory (EEPROM), a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A pin lift detection circuit for a direct current DC-DC converter, the pin lift detection circuit comprising:
   a current source;
   a switch connecting the current source to an electrical terminal of the DC-DC converter;
   a resistive divider connected to the switch and to the electrical terminal of the DC-DC converter;
   an amplifier connected to the resistive divider;
   a comparator connected to the amplifier and to the resistive divider;
   a digital filter connected to the comparator and configured to generate a flag signal in response to a disconnection between the electrical terminal of the DC-DC converter and a load of the DC-DC converter; and
   a timer circuit configured to generate a plurality of control signals for the switch, the comparator, and the digital filter;
   wherein the amplifier comprises a first input terminal connected to a reference voltage and a second input terminal configured to receive an output voltage of the resistive divider;
   further comprising a second comparator connected to the amplifier and to a control circuit of the DC-DC converter;
   wherein the amplifier comprises an output terminal connected to an input terminal of the second comparator; and
   wherein the second comparator is configured to cause the control circuit of the DC-DC converter to disable the DC-DC converter in response to the disconnection between the electrical terminal of the DC-DC converter and the load of the DC-DC converter.

2. The pin lift detection circuit of claim 1, wherein the second comparator is configured to cause the control circuit of the DC-DC converter to disable a high-side (HS) switch and a low-side (LS) switch of the DC-DC converter in response to the disconnection between the electrical terminal of the DC-DC converter and the load of the DC-DC converter.

3. The pin lift detection circuit of claim 2, wherein at least one of the HS switch and the LS switch comprises a bipolar junction transistor (BJT) or a metal-oxide-semiconductor field-effect transistor (MOSFET).

4. The pin lift detection circuit of claim 3, wherein an output inductor and an output capacitor are connected between two electrical terminals of the DC-DC converter.

5. The pin lift detection circuit of claim 1, wherein the timer circuit is further configured to generate a first control signal to enable or disable the switch and the comparator, and a second control signal to enable or disable the digital filter.

6. The pin lift detection circuit of claim 5, wherein a rising or falling edge of the second control signal has a delay with respect to a rising or falling edge of the first control signal.

7. The pin lift detection circuit of claim 1, further comprising a resistor-capacitor (RC) circuit that includes a resistor and a capacitor.

8. A direct current DC-DC converter comprising:
   a pin lift detection circuit comprising:
      a current source;
      a switch connecting the current source to an electrical terminal of the DC-DC converter;
      a resistive divider connected to the switch and to the electrical terminal of the DC-DC converter;
      an amplifier connected to the resistive divider;
      a comparator connected to the amplifier and to the resistive divider;
      a digital filter connected to the comparator and configured to generate a flag signal in response to a disconnection between the electrical terminal of the DC-DC converter and a load of the DC-DC converter; and
      a timer circuit configured to generate a plurality of control signals for the switch, the comparator, and the digital filter;
   a high-side (HS) driver;
   an HS switch connected to the HS driver;
   a low-side (LS) driver;
   an LS switch connected to the LS driver; and
   a control circuit connected to the pin lift detection circuit and configured to control the HS driver, the HS switch, the LS driver, and the LS switch;
   wherein the amplifier comprises a first input terminal connected to a reference voltage and a second input terminal configured to receive an output voltage of the resistive divider;
   wherein the pin lift detection circuit further comprises a second comparator connected to the amplifier and to the control circuit of the DC-DC converter; and
   wherein the second comparator is configured to cause the control circuit of the DC-DC converter to disable the HS switch and the LS switch of the DC-DC converter in response to the disconnection between the electrical terminal of the DC-DC converter and the load of the DC-DC converter.

9. The DC-DC converter of claim 8, wherein an output inductor and an output capacitor are connected between two electrical terminals of the DC-DC converter.

10. The DC-DC converter of claim 8, wherein the timer circuit is further configured to generate a first control signal to enable or disable the switch and the comparator of the pin lift detection circuit, and a second control signal to enable or disable the digital filter.

11. The DC-DC converter of claim 10, wherein a rising or falling edge of the second control signal has a delay with respect to a rising or falling edge of the first control signal.

12. The DC-DC converter of claim 8, wherein the pin lift detection circuit further comprises a resistor-capacitor (RC) circuit that includes a resistor and a capacitor.

13. A pin lift detection circuit for a buck direct current DC-DC converter, the pin lift detection circuit comprising:
   a current source;
   a switch connecting the current source to an electrical terminal of the buck DC-DC converter;
   a resistive divider connected to the switch and to the electrical terminal of the buck DC-DC converter;
   an amplifier connected to the resistive divider;
   a first comparator connected to the amplifier and to the resistive divider;
   a digital filter connected to the first comparator and configured to generate a flag signal in response to a disconnection between the electrical terminal of the buck DC-DC converter and a load of the buck DC-DC converter;
   a timer circuit configured to generate a plurality of control signals for the switch, the first comparator, and the digital filter; and
   a second comparator connected to the amplifier and to a control circuit of the buck DC-DC converter and configured to cause the control circuit of the buck DC-DC converter to disable the buck DC-DC converter in response to the disconnection between the electrical terminal of the buck DC-DC converter and the load of the buck DC-DC converter.

* * * * *